(12) United States Patent  
Partington

(10) Patent No.: US 8,691,433 B2
(45) Date of Patent: Apr. 8, 2014

(54) BATTERY

(75) Inventor: Kenneth Michael Partington, Lancashire (GB)

(73) Assignee: Enersys Limited, Bristol (GB)

( * ) Notice: Subject to any disclaimer, the term of this patent is extended or adjusted under 35 U.S.C. 154(b) by 864 days.

(21) Appl. No.: 11/597,194

(22) PCT Filed: May 26, 2005

(86) PCT No.: PCT/GB2005/002069
§ 371 (c)(1),
(2), (4) Date: Mar. 6, 2008

(87) PCT Pub. No.: WO2005/119815
PCT Pub. Date: Dec. 15, 2005

(65) Prior Publication Data
US 2008/0213660 A1 Sep. 4, 2008

(30) Foreign Application Priority Data
Jun. 2, 2004 (GB) .................................. 0412291.7

(51) Int. Cl.
H01M 2/02 (2006.01)
H01M 2/04 (2006.01)
H01M 2/12 (2006.01)

(52) U.S. Cl.
USPC ............................ 429/187; 429/175; 429/176

(58) Field of Classification Search
USPC .................. 429/163–187; D13/106
See application file for complete search history.

(56) References Cited

U.S. PATENT DOCUMENTS

| | | | | |
|---|---|---|---|---|
| 1,725,905 A | * | 8/1929 | Galloway | 429/187 |
| 3,397,089 A | * | 8/1968 | Sasagawa et al. | 429/160 |
| 4,391,036 A | * | 7/1983 | Kishimoto et al. | 29/623.2 |
| 4,444,853 A | * | 4/1984 | Halsall et al. | 429/54 |
| 4,632,888 A | | 12/1986 | Kump et al. | |
| 4,752,543 A | * | 6/1988 | Anderson et al. | 429/179 |
| 4,770,957 A | | 9/1988 | Miyagawa | |
| 4,891,270 A | * | 1/1990 | Jergl et al. | 429/53 |
| 5,263,792 A | | 8/1993 | Larkin et al. | |
| 5,787,027 A | | 7/1998 | Dolan et al. | |
| 6,007,937 A | * | 12/1999 | Ruiz Rodriguez et al. | 429/94 |
| 2002/0031700 A1 | * | 3/2002 | Wruck et al. | 429/61 |
| 2002/0098412 A1 | * | 7/2002 | Rodriguez et al. | 429/149 |
| 2003/0017381 A1 | * | 1/2003 | Mittal et al. | 429/89 |

FOREIGN PATENT DOCUMENTS

| | | |
|---|---|---|
| CN | 2265385 | 10/1997 |
| DE | 29801414 U1 | 3/1998 |
| DE | 101 15 727 A1 | 10/2001 |
| EP | 0 324 956 | 7/1989 |

(Continued)

OTHER PUBLICATIONS

Japanese Office Action for Japanese Patent Application No. 2007-514094; mailed Sep. 14, 2011.

(Continued)

*Primary Examiner* — Jonathan Crepeau
*Assistant Examiner* — Jacob Buchanan
(74) *Attorney, Agent, or Firm* — Myers Bigel Sibley & Sajovec, P.A.

(57) ABSTRACT

The invention relates to a battery comprising a casing having at least one handle, which is formed integrally with the casing and is at least partially recessed into the upper surface of the casing.

18 Claims, 2 Drawing Sheets

(56) References Cited

FOREIGN PATENT DOCUMENTS

| EP | 0 324 956 | A1 | 7/1989 | | |
|----|-----------|----|--------|---|---|
| EP | 0 445 662 | A1 | 9/1991 | | |
| EP | 0 573 064 | A1 | 12/1993 | | |
| EP | 0 917 219 | A1 | 11/1997 | | |
| EP | 1 225 651 | A1 | 7/2002 | | |
| EP | 1225651 | A1 * | 7/2002 | ............ | H01M 10/50 |
| GB | 1 485 926 | | 9/1977 | | |
| GB | 2 087 134 | A | 5/1982 | | |
| JP | U 56032373 | | 3/1981 | | |
| JP | U63012158 | | 1/1988 | | |
| JP | 10 40895 | | 2/1988 | | |
| JP | 10040895 | A | 2/1998 | | |
| JP | 2000 277078 | | 10/2000 | | |
| JP | 2000277078 | A | 10/2000 | | |

OTHER PUBLICATIONS

Japanese Office Action with Translation for corresponding application No. 2007-514094 mailed Aug. 14, 2012.

* cited by examiner

BATTERY

CROSS-REFERENCE TO RELATED APPLICATIONS

The present application is a U.S. national phase application of PCT International Application No. PCT/GB2005/002069, having an international filing date of May 26, 2005 and claiming priority to Great Britain Application No. 0412291.7 filed Jun. 2, 2004, the disclosures of each of which are incorporated by reference herein in their entireties. The above-reference PCT application was published in the English language and has International Publication No. WO 2005/119815.

FIELD OF THE INVENTION

The invention relates to a handle for a battery, for example, a handle for a lead acid battery.

BACKGROUND OF THE INVENTION

A lead acid battery typically comprises a plurality of positive plates and a plurality of negative plates. The plates are usually rectangular and are stacked together in an alternating sequence. The plate stack is held in a box-like casing. In use, the plates are immersed in acid electrolyte or are in contact with an acid electrolyte containing material.

Conventional lead acid batteries have many forms of handle. Typically, those handles are manufactured separately from the container or lid of the battery and may take the form of mouldings or plastic rope or webbing. Alternatively, the handles may be in the form of profiles included in the container or lid of the battery.

Those known designs of battery handle either require components to be manufactured separately from the main components of the casing, which increases the cost of the battery, and/or require additional space to accommodate the handle profile. Lead acid batteries are often stored in cabinets or racks in large numbers and it is desirable to reduce the space taken up by each battery.

The invention seeks to overcome or mitigate those problems.

SUMMARY OF THE INVENTION

The invention provides a battery comprising a casing and having at least one handle which is formed integrally with the casing and is at least partially recessed into the upper surface of the casing.

The handle of the invention comprises a handle member having sufficient finger room around it that it can, in use, be grasped by the user. The handle member and/or the finger space are at least partially, and are preferably fully, 'sunk' into the upper surface of the casing, thereby making use of the space available within the battery components (in particular, the headspace above the battery electrolyte) and reducing the volume of cabinet space required to store the battery. Thus, in the region of the handle member, the casing is shaped so as to project inwardly into the battery, thereby providing 'finger room' around the handle member.

In one embodiment, the battery comprises two handles, each of which is at least partially recessed into the upper surface of the casing. Preferably, those handles are spaced apart and are arranged in opposing directions.

In some cases, it may be acceptable to have, in addition to the at least one recessed handle, a handle which projects from a side wall of the battery casing. That arrangement is especially suitable for a battery having connector studs which project from a side wall of the battery casing, in which case the projecting handle desirably extends from that same wall to an equal or greater extent than the studs. Accordingly, in one embodiment the battery comprises a first handle which is at least partially recessed into the upper surface of the casing and a second handle which projects from a side wall of the casing. Advantageously, the battery has a generally rectangular cross-section in a horizontal plane and the first handle is located in the vicinity of one end of the battery and the second handle projects from the side wall of the casing at the opposite end of the battery.

Whilst it is within the scope of the invention for the at least one recessed handle to be only partially recessed into the upper surface of the casing, preferably that handle is fully recessed so that no part of the handle projects upwardly from the casing.

Typically, the casing will comprise a container in which the plates are placed during manufacture of the battery, and a lid for the container. In that embodiment, the at least partially recessed handle or handles are formed in the lid.

The at least partially recessed handle is formed integrally with the casing, and is therefore not movable in relation to the casing. This gives important benefits of economy and simplicity of manufacture, and of robustness, as compared to non-integral handles. The handle may be formed integrally with the lid as a single moulding.

The member of the handle which is grasped by the user may be of any suitable form. Advantageously, that member is in the form of a bar. Advantageously, the member is a profiled member, for example, the member may have an 'L'-shaped profile.

The battery may have a generally rectangular cross-section in a horizontal plane and the at least partially recessed handle or handles may comprise a handle member formed in the upper surface of the casing which extends perpendicular to the length of the battery and have a recess for the user's fingers formed underneath the member. The recess may contain a rib running lengthways with respect to the battery and being connected to the handle member by a support member, thereby supporting and reinforcing the handle member. The battery may be a multi-cell battery having partitions between the cells. Advantageously, the rib is integral with a cell partition formed in the casing.

The invention is applicable to all types of battery, for 25 example, the battery may be a lead acid battery, especially a sealed lead acid battery.

Terms such as "upper" and "side" are to be understood as referring to the battery when in its usual working orientation.

BRIEF DESCRIPTION OF THE DRAWINGS

An embodiment of the invention will now be described for the purposes of illustration only with reference to the figures, in which.

DETAILED DESCRIPTION OF THE INVENTION

The present invention now will be described more fully hereinafter with reference to the accompanying drawings, in which preferred embodiments of the invention are shown.

This invention may, however, be embodied in many different forms and should not be construed as limited to the embodiments set forth herein; rather, these embodiments are provided so that this disclosure will be thorough and complete, and will fully convey the scope of the invention to those skilled in the art. Like numbers refer to like elements throughout.

Figure 1:
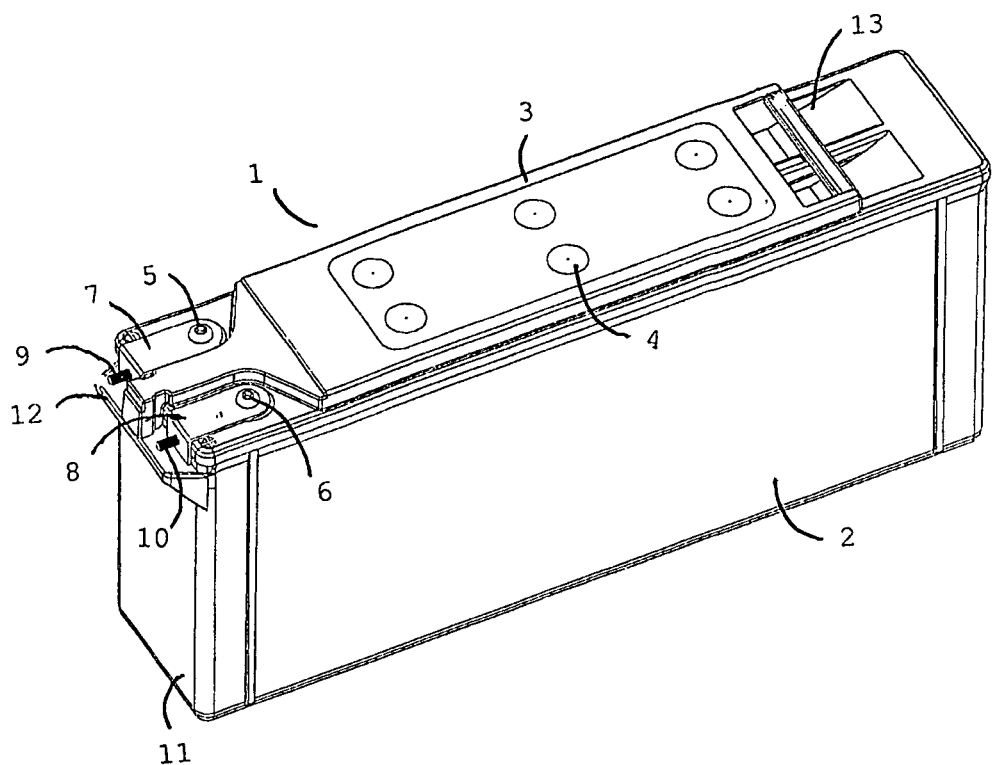
FIG. 1 is a perspective view of a battery according to invention.

FIG. 1 shows a sealed lead acid battery 1 having a casing comprising a box 2 and a lid 3. The battery is a six-cell sealed lead acid battery and the lid includes six gas vents 4. At one end of the battery lid are terminals 5, 6 which are provided with 'L' shaped brackets 7, 8. Those brackets extend over the end of the battery and have connector studs 9, 10 which project outwardly from the end side wall 11 of the battery. Below those studs is a conventional handle 12 in the form of a profile which projects from the end side wall 11.

Figure 2:
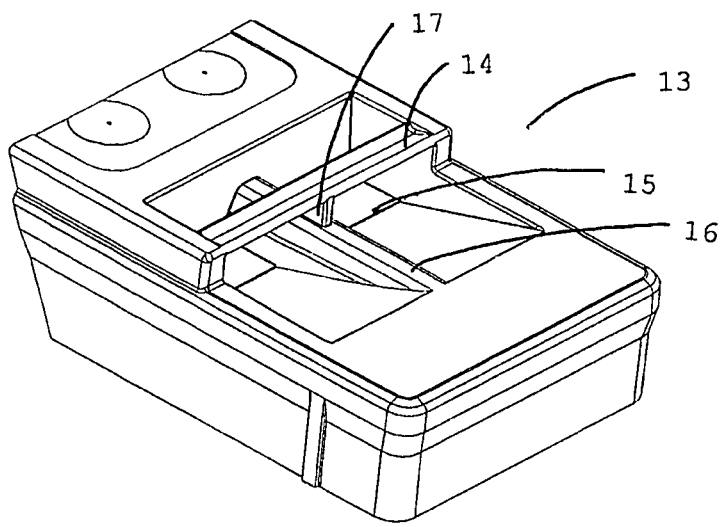
FIG. 2 is an enlarged view of the handle of the battery shown in FIG. 1.

Toward the other end of the lid is recessed handle 13 which, as shown in FIG. 2, comprises a profiled handle member 14 which extends across the width of the battery lid, and recess 15 for the user's fingers. The recess is defined by the upper wall of the casing which, in the vicinity of the handle member 14 projects downwardly into the headspace above the electrode plates. The handle also comprises rib 16 which runs through the recess 15 in a lengthways direction and is connected to the profiled handle member 14 by support member 17.

Figure 3:
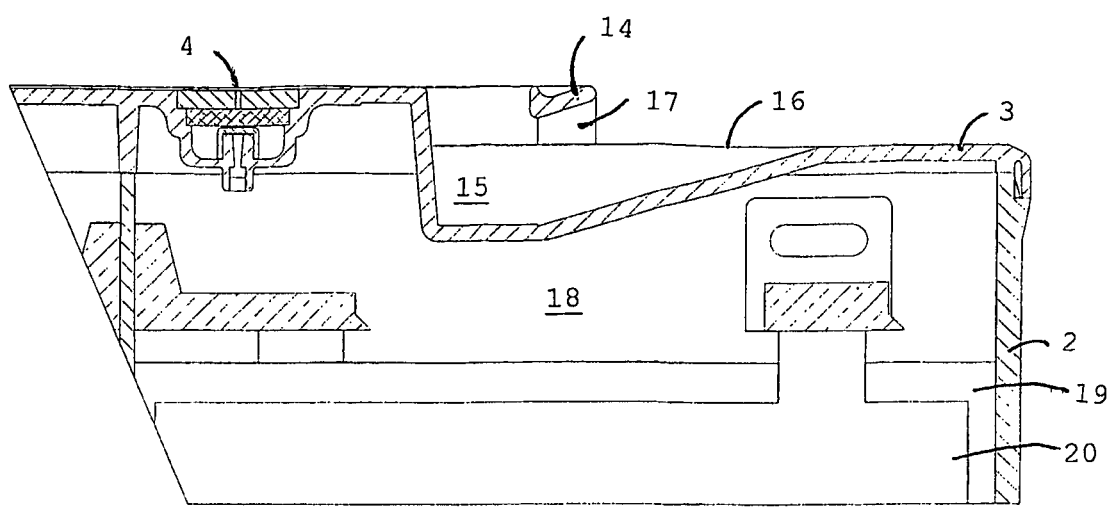
FIG. 3 is a partial cross-sectional view of the handle shown in FIG. 2.

FIG. 3 shows a partial cross-section throughout the battery in a vertical plane lengthways to the battery. As can be seen from FIG. 3, profiled handle member 14 has an 'L' shaped profile for increased strength. As can also be seen from FIG. 3, the recess 15 in the lid 3 projects into the headspace 18 above the electrolyte absorbent material 19 and plates 20.

The foregoing is illustrative of the present invention and is not to be construed as limiting thereof. Although a few exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. Therefore, it is to be understood that the foregoing is illustrative of the present invention and is not to be construed as limited to the specific embodiments disclosed, and that modifications to the disclosed embodiments, as well as other embodiments, are intended to be included within the scope of the appended claims. The invention is defined by the following claims, with equivalents of the claims to be included therein.

The which is claimed is:

1. A battery comprising a casing and a plurality of battery components positioned within the casing, the battery components including a plurality of electrode plates and a battery strap electrically interconnecting the electrode plates, wherein the casing has at least one handle which is formed integrally with the casing and is at least partially recessed into the upper surface of the casing such that the handle projects downwardly below an uppermost portion of the strap.

2. A battery as claimed in claim 1 which comprises two handles, each of which is at least partially recessed into the upper surface of the casing.

3. A battery as claimed in claim 1 which comprises a first handle which is at least partially recessed into the upper surface of the casing and a second handle which projects from the side of the casing.

4. A battery as claimed in claim 3 which has a generally rectangular cross section in a horizontal plane and in which the first handle is located in the vicinity of one end of the battery and the second handle projects from the side wall of the casing at the opposite end of the battery.

5. A battery as claimed in claim 1 in which the at least one at least partially recessed handle is fully recessed into the upper surface of the casing.

6. A battery as claimed claim 1 in which the upper part of the casing is in the form of a lid and the at least one at least partially recessed handle is integrally formed in the lid.

7. A battery as claimed in claim 1 in which the at least one at least partially recessed handle comprises a profiled member which, in use, is grasped by a user.

8. A battery as claimed in claim 1 having a generally rectangular cross-section is a horizontal plane and in which the at least one at least partially recessed handle comprises a handle member formed in the upper surface of the casing and extending perpendicular to the length of the battery and a recess for a user's fingers formed underneath the handle member.

9. A battery as claimed in claim 8 in which the recess contains a rib running lengthways with respect to the battery and being connected to the handle member by a support member.

10. A battery as claimed in claim 9, wherein the battery is a multi-cell battery having cell partitions in the casing, and wherein the rib is integral with one of the cell partitions.

11. A battery as claimed in claim 1 in which is a sealed lead acid battery.

12. A battery as claimed in claim 1, wherein the at least one handle is not movable in relation to the casing.

13. A battery comprising a casing including a box and a lid and a plurality of battery components positioned within the casing, the plurality of battery components including a plurality of electrode plates and battery electrolyte, the lid having at least one handle which is at least partially recessed into the upper surface of the lid such that the handle projects downwardly into a headspace above the battery electrolyte and below an uppermost edge of the box.

14. A battery as claimed in claim 13, wherein the at least one handle is formed integrally with the lid as a single moulding.

15. A battery as claimed in claim 13, wherein the at least one handle is not movable in relation to the casing.

16. A battery as claimed in claim 13, wherein the at least one at least partially recessed handle defines a lowermost portion of the lid.

17. A battery comprising a casing and a plurality of battery components positioned within the casing, the battery components including a plurality of electrode plates and a plurality of vents extending to an uppermost portion of the casing, wherein the casing has at least one handle which is formed integrally with the casing and is at least partially recessed into the upper surface of the casing such that the handle projects downwardly below the vents.

18. A battery as claimed in claim 17, wherein the vents are vertically disposed.

* * * * *

UNITED STATES PATENT AND TRADEMARK OFFICE
CERTIFICATE OF CORRECTION

| | | |
|---|---|---|
| PATENT NO. | : 8,691,433 B2 | Page 1 of 1 |
| APPLICATION NO. | : 11/597194 | |
| DATED | : April 8, 2014 | |
| INVENTOR(S) | : Partington | |

It is certified that error appears in the above-identified patent and that said Letters Patent is hereby corrected as shown below:

In the Claims:
Column 3, Line 51: Please replace "The which is claimed is:"
to read -- That which is claimed is: --

Signed and Sealed this
Fourteenth Day of October, 2014

Michelle K. Lee
*Deputy Director of the United States Patent and Trademark Office*